United States Patent Office 3,236,880
Patented Feb. 22, 1966

3,236,880
9α - HALO - A - NORANDROST - 3 - ENE - 2,11,17-TRIONES AND 9α - HALO - 11 - OXO OR β - HYDROXY - A - NORTESTOSTERONES AND ACYL DERIVATIVES
Bernard Berk, Westfield, Edward Joseph Becker, Princeton, and Robert S. Robison, North Brunswick, N.J., assignors to Olin Mathieson Chemical Corporation, New York, N.Y., a corporation of Virginia
No Drawing. Filed Jan. 21, 1964, Ser. No. 339,115
12 Claims. (Cl. 260—488)

This invention relates to and has for its object the provision of new physiologically active compounds, and more particularly, compounds of the formula

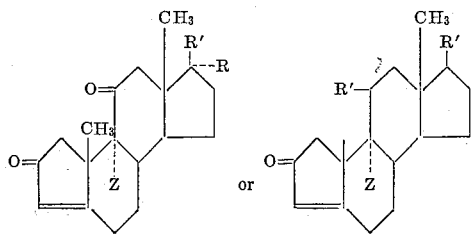

wherein Z is halo (e.g., bromo, chloro or fluoro); each R is hydrogen; each R' is selected from the group consisting of hydroxy and acyloxy and together R and R' is oxo (O=).

The preferred acyl radicals of this invention are those of hydrocarbon carboxylic acids of less than twelve carbon atoms, as exemplified by the lower alkanoic acids (e.g., acetic, propionic, butyric and tert.-pentanoic acids), the lower alkenoic acids, the monocyclic aryl carboxylic acids (e.g., benzoic and toluic acids), the monocyclic aryl lower alkanoic acids (e.g., phenacetic and β-phenylpropionic acids), the cycloalkane carboxylic and the cycloalkene carboxylic acids.

The novel compounds of this invention are pharmacologically active substances which possess anabolic activity and which may be used in place of such known anabolic steroids as 17-ethyl-19-nortestosterone in the treatment of post-operative shock and other conditions where tissue degeneration has occurred. It has been surprisingly found that the compounds of this invention possess a very low order of androgenic activity, thus rendering them desirable for anabolic use. Administration of the products of this invention may be accomplished either perorally or parenterally in the same manner 17-ethyl-19-nortestosterone, for example, the dosage and/or concentration being adjusted.

The final products of this invention are prepared by the process of this invention which entails a number of steps beginning with 9α-halo-11-keto-A-norprogesterone as the starting material. It has been found that some of the compounds of this invention, namely, 9α-halo-11-keto-A-nortestosterone, can be prepared from 9α-halo-11-keto-A-norprogesterone by subjecting the latter to the action of a microorganism of the genus Penicillium or to the action of the enzymes thereof under oxidizing and preferably aerobic conditions; and further that this new compound may be oxidized to other compounds of this invention, namely, 9α-halo-A-norandrost-3-ene-2,11,17-trione as by treatment with an oxidizing agent, such as chromic acid.

To prepare the compounds of this invention, 9α-halo-11-keto-A-norprogresterone may be first subjected to the action of enzymes of a microorganism of the genus Penicillium under oxidizing conditions. This oxidation can best be effected either by including 9α-halo-11-keto-A-norprogesterone in an aerobic culture of the microorganism, or by bringing together in an aqueous medium, the compounds, air, and enzymes of non-proliferating cells of the microorganism.

In general, the conditions of culturing the Penicillium microorganism for the purposes of this invention are (except for the inclusion of 9α-halo-11-keto-A-norprogesterone to be converted), the same as those of culturing various other microorganisms for the production of antibiotics, vitamin B–12, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoelic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation for example, by the convention methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four to ninety-six hours being feasible, but not limiting.

The microbial process described hereinabove yields 9α-halo-11-keto-A-nortestosterone and additionally upon further processing, there is obtained 9α-halo-11β-hydroxy-A-nortestosterone and the acyl derivatives thereof. 9α-halo-11-keto-A-nortestosterone is first reduced as by treatment with a reducing agent such as sodium borohydride to yield the 9α-halo-11β-hydroxy-A-nortestosterone derivatives. These derivatives may then be treated with an acylating agent, for example, an acid anhydride (i.e., acetic anhydride) or an acyl halide (e.g., acetyl chloride) in a basic medium (i.e., in pyridine) to yield the acyl derivatives of the instant invention.

The invention may be illustrated by the following examples:

*Example 1.—9α-fluoro-11-keto-A-nortestosterone*

Fifteen grams of 9α-fluoro-11-keto-A-norprogesterone is added as a methanolic solution to a medium containing 2.5% starch as a source of carbon and energy and 1% hydrolized peanut meal which is a source of nitrogen and other nutrients. The medium is then inoculated with 5% by volume of the organism Penicillium (deposited with the American Type Culture Collection in Washington, D.C. and assigned the identification number ATCC 11594) which has been growing for forty-eight hours in a medium containing 1.5% soybean meal, 1.1% cerelose, 1.5% yeastamin, 0.25% calcium carbonate and 0.22% soybean oil. After twenty-four hours of agitation and aeration at 25° C., the filtered broth is extracted with chloroform and the organic phase is then washed with water, dried over sodium sulfate and evaporated in vacuum to a brown resinous mass. This material is triturated with hexane and then chromatographed on acid-washed alumina. Elution of the column with benzene, then benzene/chloroform 1:1 gives 4.7 g. of 9α-fluoro-11-keto-A-nortestosterone. The product is purified further by recrystallization from acetone/hexane. M.P. 219–220° C. $[\alpha]_D^{23}$ +84° 21.47 mg./2 ml. CHCl$_3$ $\lambda_{max.}^{EtOH}$ 227 m$\mu$. $\epsilon_{max}$ 16,500 $\lambda_{max.}^{Nujol}$ 5.79, 5.97, 6.16, 8.81, 9.37, 10.72, 11.20, 11.71$\mu$.

*Analysis.*—Calc'd. for C$_{18}$H$_{23}$O$_3$F (306.36): C=70.56%; H=7.57%; F=6.20%. Found: C=70.50%; H=7.63%; F=6.94%.

Similarly, following the procedure set forth in Example 1, but substituting equivalent amounts of 9α-chloro-11-keto-A-norprogesterone or 9α-bromo-11-keto-A-norprogesterone for 9α - fluoro - 11 - keto - A - norprogesterone, there is obtained respectively 9α-bromo-11-keto-A-nortestosterone and 9α-chloro-11-keto-A-nortestosterone.

*Example 2.—9α-fluoro-11-keto-A-nortestosterone-17β-acetate*

244 mg. of the testosterone is dissolved in 2 ml. pyridine and 1 ml. of acetic anhydride. The solution is allowed to stand at room temperature for seventeen hours. It is then diluted with water and extracted into 3 x 20 ml. of chloroform. The organic phase is washed with dilute sulfuric acid, water and then dried over sodium sulfate and evaporated. Recrystallization from acetone/hexane gives 207 mg. of 9α-fluoro-11-keto-A-nortestosterone acetate. M.P. 139–141° C.

$\lambda_{max.}^{Nujol}$ 5.79, 5,85, 6.11, 8.02, 9.50 and 11.11$\mu$.

Similarly, following the procedure set forth in Example 2, but substituting 9α-chloro or 9α-bromo-11-keto-A-nortestosterone for the 9α-fluoro-11-keto-A-nortestosterone, the respective 9α-bromo- and 9α-chloro-11-keto-A-nortestosterone-17β-acetate derivatives are obtained.

*Example 3.—9α-fluoro-A-norandrost-3-ene-2,11,17-trione*

175 mg. of 9α-fluoro-11-keto-A-nortestosterone is dissolved in 12 ml. of acetone. 8 N chromic acid solution (Jones reagent) is added dropwise until an excess of the reagent is evident by color. After one hour at room temperature, the solution is diluted with water and the steroid extracted into chloroform 3 x 40 ml. The organic phase is washed with water, dried over sodium sulfate and evaporated to a crystalline mass. Recrystallization from acetone/hexane gives 151 mg. of 9α-fluoro-A-norandrost-3-ene-2,11,17-trione. M.P. 234–236° C.

$\lambda_{max.}^{Nujol}$ 5.73, 5.82 (broad), 6.13, 8.71, 9.18, 10.70 and 11.18$\mu$ Similarly, following the procedure set forth in Example 3, but substituting the 9α-chloro and 9α-bromo-11-keto-A-nor-testosterone for the 9α-fluoro-11-keto-A-nor-testosterone, there is obtained the respective 9α-chloro and 9α-bromo-A-norandrost-3-ene-2,11,17-trione derivatives.

*Example 4.—9α-fluoro-11β-hydroxy-A-nortestosterone*

190 mg. of the 9α-fluoro-11-keto-A-nortestosterone is dissolved in 10 ml. of methanol. To this solution is added 20 mg. of solid sodium borohydride. After standing at room temperature for one hour, the solution is neutralized with 10% sulfuric acid. Dilution with water resulted in the precipitation of the product, 161 ml., M.P. 200–201° C. Recrystallization from acetone/hexane gives 139 mg. of 9α - fluoro - 11β - hydroxy-A-nortestosterone. M.P. 195° C. resolidifies 211–213° C. $[\alpha]_D^{23}$ +53° 21.23 mg./2 ml. CHCl$_3$ (5 gtt. MeOH)

$\lambda_{max.}^{EtOH}$ 231 m$\mu$; $\epsilon_{max}$ 15,500; $\lambda_{max.}^{Nujol}$ 2.86, 5.93, 6.16, 9.27, 9.57, 11.09 and 11.80$\mu$.

*Analysis.*—Calc'd for C$_{18}$H$_{25}$O$_3$F (308.38): C=70.10%; H=8.17%; F=6.16%. Found: C=70.08%; H=8.14%; F=6.39%.

Similarly, following the procedure set forth in Example 4, but substituting the 9α-chloro and 9α-bromo-11-ketones for the 9α-fluoro-11-ketone, there is obtained the respective 9α-bromo or 9α-chloro-11-hydroxy-A-nortestosterone.

*Example 5.—9α-fluoro-11β-hydroxy-A-nortestosterone-17β-acetate*

40 mg. of 9α-fluoro-11β-hydroxy-A-nortestosterone is dissolved in 1 ml. of pyridine and 1 ml. of acetic anhydride. After standing at room temperature for sixteen hours, the solution is diluted with ice with agitation. The precipitated product is filtered and washed with water until the wash is neutral giving 42.3 mg. of the 9α-fluoro-11β-hydroxy-A-nortestosterone-17β-acetate. M.P. 237–240° C.

$\lambda_{max.}^{EtOH}$ 231 m$\mu$; $\epsilon_{max}$ 16,000; $\lambda_{max.}^{Nujol}$ 2.94, 5.78, 5.94, 6.12, 8.04 and 9.55$\mu$.

*Example 6.—9α-fluoro-11β-hydroxy-A-nortestosterone-11,17-diacetate*

9α - fluoro-11β-hydroxy - A - nortestosterone is reacted with acetic anhydride, acetic acid in the presence of p-toluene-sulfonic acid as a catalyst. After standing at room temperature for twelve hours, the solution is diluted with ice water agitation. The precipitated product is filtered and washed with water until the wash is neutral giving 9α-fluoro-A-nortestosterone-11,17-diacetate.

The invention may be variously otherwise embodied within the scope of the appended claims.

What is claimed is:

1. A compound of the formula

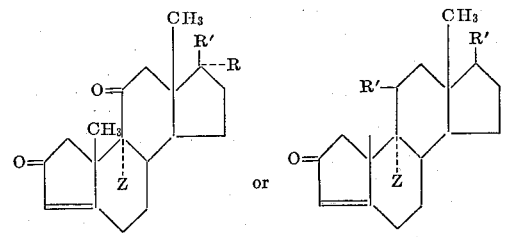

wherein Z is halo; each R is hydrogen; each R' is selected from the groups consisting of hydroxy and acyloxy wherein the acyl radical is of a hydrocarbon carboxylic acid of less than twelve carbon atoms; and together R and R' is oxo (O=).

2. 9α-halo-11-keto-A-nortestosterone.
3. 9α-fluoro-11-keto-A-nortestosterone.
4. 9α-fluoro-11-keto-A-nortestosterone acetate.
5. 9α-fluoro-A-norandrost-3-ene-2,11,17-trione.
6. 9α-fluoro-11β-hydroxy-A-nortestosterone.
7. 9α-fluoro-11β-hydroxy-A-nortestosterone-17β-acetate.
8. 9α-halo-A-norandrost-3-ene-2,11,17-trione.
9. 9α-halo-11-keto-A-nortestosterone acetate.
10. 9α-halo-11β-hydroxy-A-nortestosterone.
11. 9α-halo-11β-hydroxy-A-nortestosterone-11,17-diacetate.
12. 9α-fluoro-11β-hydroxy-A-nortestosterone-11,17-diacetate.

References Cited by the Examiner

UNITED STATES PATENTS 3,110,733   11/1963   Weisenborn _____ 260—488

LORRAINE A. WEINBERGER, *Primary Examiner.*

D. P CLARKE, V. GARNER, *Assistant Examiners.*